United States Patent Office 2,921,658
Patented Jan. 19, 1960

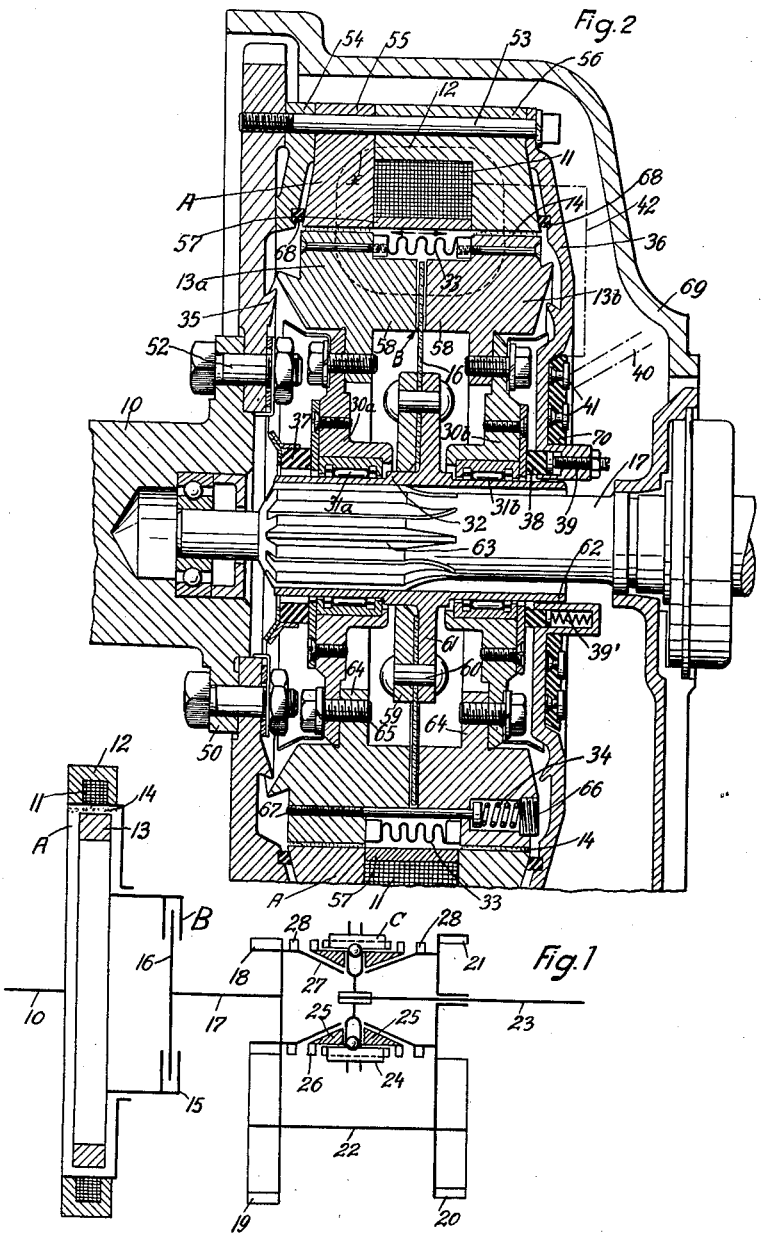

2,921,658

MAGNETIC PARTICLE AND FRICTION CLUTCH WITH LOW INERTIA OUTPUT MEMBER

Hans-Joachim M. Förster, Stuttgart-Bad Cannstatt, Germany, assignor to Daimler-Benz Aktiengesellschaft, Stuttgart-Unterturkheim, Germany Application February 27, 1956, Serial No. 567,919

Claims priority, application Germany March 3, 1955

13 Claims. (Cl. 192—21.5)

My invention relates to a clutching mechanism for the transfer of the driving couple from the engine to a speed change transmission of a motor vehicle, particularly to a speed change transmission of the type having means for synchronizing toothed clutches prior to the engagement thereof.

In speed change transmissions of motor vehicles it is a requirement that the moment of inertia of the masses fixed to the input shaft of the transmission be as low as possible in order to minimize the energy required to accelerate and decelerate the input shaft for the purpose of synchronization coincidental to the gear shifting operation. Where such masses are comparatively large they will adversely affect the gear shifting operation by retarding the synchronization of the input shaft which takes place while the clutch interposed between the transmission and the engine is disengaged. This applies particularly to speed change transmissions of the type including locking means which positively prevent the gear shifting clutches from operation until the clutch members are synchronized. Speed change transmissions of that type can be more easily shifted from one speed to another where the moment of inertia of the input shaft is small. The major portion of the masses which must be accelerated or decelerated during the synchronizing operation is formed by the clutch disk. Therefore, it is the object of the present invention to reduce the momentum of this clutch disk to a minimum to thereby facilitate the synchronization during the gear shifting operation.

My invention further relates to a magnetic clutch of the type involving a layer of a liquid suspension of magnetizable particles adapted to be solidified under the influence of magnetic flux. While clutches of this type permit of engagement under load and of coincidental relative slippage of their members and are, therefore, particularly adapted to transfer the driving couple from the engine to a speed change transmission of a motor vehicle, they involve the disadvantage that upon deenergization they will continue to transfer residual minimum torque until the magnetizable layer is liquefied by relative displacement of the clutch elements requiring a force sufficient to overcome the residual torque. The residual couple acting on the input shaft of the transmission interferes with the synchronizing operation and, therefore, renders the magnetic clutch of this type unfit for direct cooperation with speed change transmissions of the self-synchronizing type.

It is another object of the present invention to provide an improved clutching mechanism for the transfer of the driving couple from the engine to a speed change transmission of a motor vehicle, which clutching mechanism includes a magnetic clutch involving a layer of a liquid suspension of magnetizable particles adapted to be solidified by a magnetic flux.

More particularly, it is an object of the present invention to provide a magnetic clutching mechanism for the purpose set forth which is of simple and rugged structure, reliable in operation, adapted to be produced at low cost, capable of easy electrical control, has a long life owing to a minimum of wear, and has an output shaft of an extremely low moment of inertia lending itself to the cooperation with a speed change transmission of the self-synchronizing gear shift type.

Further objects of my invention will appear from the detailed description of a preferred embodiment of my invention following hereinafter, it being understood that the terms and phrases in such description have been chosen for the purpose of illustrating the invention rather than that of restricting or limiting the same. The features of novelty for which patent protection is sought will be pointed out in the appended claims.

In the drawings,

Fig. 1 is a diagrammatic representation of my novel clutching mechanism and the associated speed change transmission of the self-synchronizing gear shift type, and Fig. 2 is a partial axial section taken through my novel clutching mechanism.

The novel clutching mechanism for the transfer of the driving couple from the engine shaft 10 to a speed change transmission C comprises, broadly speaking, a primary clutch A and a secondary clutch B both arranged in tandem relationship. The primary clutch A is adapted by the shaft 10 to be connected to the engine, and the secondary clutch B is adapted by a shaft 17 to be connected to the transmission C. Each of the clutches includes a driving member 12, or 15 respectively, and a driven member 13, or 16 respectively. The driven member 16 of the secondary clutch B has a considerably lower moment of inertia than the driven member 13 of the primary clutch A. Each of the clutches A and B is of the type permitting of engagement under load and of a coincidental relative slippage of its members. Preferably, the clutch A is a clutch of the type in which a gap 14 confined by the driving member 12 and the driven member 13 contains a clutching medium, preferably a liquid, in which magnetizable particles are suspended, means for producing a flux extending through said gap being provided. Under the influence of such flux the medium will be solidified thereby causing engagement of the clutch under load and with relative slippage of the clutch members coincidental to such engagement. As the flux increases, the slippage will decrease until both members of the clutch revolve in unison.

The driving primary clutch member 12 comprises an annular member of magnetizable material provided with an internal annular groove accommodating an electrical coil 11, the windings of which are coaxially disposed with respect to shaft 10. The driven primary clutch member 13 is formed by a ring of magnetizable material surrounded by the annular member 12 and spaced therefrom by the gap 14. As the member 13 must conduct the flux it must necessarily have a considerable mass. The secondary clutch B serves the purpose of immunizing the transmission C against any adverse influence of such mass. The secondary clutch B is of the friction type. Its driven member 16 is a simple disk of small thickness having a comparatively low moment of inertia. The transmission of the self-synchronizing gear shift type comprises gears 18, 19, 20 and 21. Gear 18 is fixed to shaft 17. Gears 19 and 20 are fixed to a lay shaft 22, and gear 21 is fixed to the output shaft 23 of the transmission which may drive the rear wheels of the motor vehicle.

The gear shifting operation is effected by actuation of a self-synchronizing clutching mechanism comprising, for instance, a slidable sleeve 24 and one or more friction members 25, such mechanism being mounted on shaft 23 for common rotation therewith, but for sliding motion relative thereto. The friction members 25 are provided with locking elements 26 and so cooperate with conical clutch member 27 fixed to the gear 18 and with similar conical clutch members fixed to gear 21 that the locking members 26 prevent the engagement of the internal clutch teeth of the sleeve 24 with the clutch teeth 28 of the gears 18 or 21 until synchronization of the clutch teeth to be engaged has been effected.

As the transmission C of the self-synchronizing type does not form part of the present invention it is believed that the cursory description hereinabove with reference to the diagrammatic showing in Fig. 1 will suffice. For greater details reference may be had to the co-pending patent application Serial No. 503,562.

While the transmission C shown in Fig. 1 has but two speeds, a transmission having any desired greater number of speeds may be substituted therefor.

Preparatory to a gear shifting operation clutch A is deenergized. Under the effect of the remaining magnetism, however, the medium in gap 14, while softening to a certain extent, still transfers sufficient force to the driven primary clutch member 13 to cause same to rotate in unison with the driving member 12 and the engine shaft 10. For this reason, clutch B is provided which will now be disengaged. Thereafter, the gear shifting operation takes place in which the synchronization is effected by the clutching mechanism 24, 25, 26 in a rapid and effective manner without interference by shaft 17, because this shaft may be rapidly accelerated or decelerated owing to the comparatively small moment of inertia of disk 16 which now rotates independently of the heavy magnetizable ring 13. Upon completion of the gear shifting operation, first the secondary clutch B is engaged causing disk 16 to accelerate or decelerate the driving secondary clutch member 15 and the driven primary clutch member 13. In this operation, the clutch members 12 and 13 of the primary clutch A are relatively displaced whereby the medium in gap 14 is de-energized and thereby liquefied. In the following phase of the clutch actuation the flux through gap 14 gradually increases to thereby gradually solidify the medium in gap 14, whereby the input shaft 10 of the clutching mechanism will be smoothly clutched to the output shaft 17 of the clutching mechanism.

A preferred embodiment of my novel clutching mechanism is illustrated in Fig. 2 in which the primary clutch A and the secondary clutch B are arranged in coaxial nested relationship and are included in a single casing so as to constitute a unitary structure, both clutches being provided with a common winding adapted to induce a single flux for engagement of both of the clutches A and B. Preferably, the clutch members conducting the flux are so coordinated to each other that at any instant during the clutch actuation period the torque transferred by the secondary clutch B exceeds the couple transferring capacity of clutch A thus causing the latter to slip. As a result, clutch A will not commence to grip until after the slippage in clutch C has ceased. In other words, the winding 11 sets up a flux which simultaneously actuates both the primary clutch A and the secondary clutch B in such a manner that the slippage occurring in the secondary clutch B is lower at any time than the slippage occurring in the primary clutch A.

The engine shaft 10 has a flange 50 to which the conventional disk-shaped starter gear 35 is secured by bolts 52. The annular driving clutch member 12 of steel is fixed to the gear 35 by a plurality of circumferentially distributed screws 53, a washer 54 being interposed for a purpose to be described later. The annular member 12 is preferably composed of two parts 55 and 56 to facilitate the insertion of the winding 11. The latter is mounted on a ring 57 of brass or any other non-magnetizable material whose inner surface lies flush with that of the annular parts 55 and 56 of the member 12. In this embodiment, the driven primary clutch member comprises a pair of rings 13a and 13b of a magnetizable material, such as steel. These rings are surrounded by the driving member 12 and are spaced therefrom by the gap 14. This gap is filled with a medium including magnetizable particles, preferably with a suspension of pulverized iron in oil. Alternatively, however, the medium may be air. The rings 13a and 13b have opposed inward extensions 58 which constitute the driving member or second part of the secondary clutch B and, in the embodiment shown, are integral with the rings 13a and 13b. The friction disk 16 is located between the extensions 58 of the rings 13a and 13b. It is clamped by a clamping ring 59 and rivets 60 to the flange 61 of a sleeve 62 which is slidably mounted on the splined end 63 of the output shaft 17 of the clutching mechanism for common rotation therewith. Suitable means are provided for mounting the rings 13a and 13b for relative axial displacement and mutual attraction under the influence of a flux set up by the coil 11 and extending through the elements 55, 56, 13b, 16 and 13a. For this purpose, internal flanges 64 of the rings 13a and 13b are fixed by bolts 65 to hub members 30a and 30b of brass which are journalled on the sleeve 62 by needle bearings 31a and 31b permitting of both rotation and axial displacement of the hub members 30a and 30b relative to shaft 17.

A spring is coordinated to the rings 13a and 13b and tends to urge the same apart to thereby resiliently disengage the rings 13a and 13b from the disk 16. Preferably, this spring is constituted by an annular corrugated sheet metal diaphragm 33 inserted in opposed circumferential recesses of the rings 13a and 13b and having a sealed contact therewith. Thus, the diaphragm prevents the iron pulver-laden medium in gap 14 from getting into the space between the rings 13a and 13b and from interfering with the disengagement of clutch B.

If desired, the spring effect of the diaphragm 33 may be promoted by additional springs 34 each inserted in a lateral bore of member 56 and acting on a plug 66 having threaded engagement with such bore and on the head of a screw 67 fixed to member 13a and extending into said bore.

Under the effect of the centrifugal force the magnetic particles collect in the gap 14 provided between the outer driving primary clutch member 12 and the inner driven primary clutch members 13a and 13b. A cover plate 36 is attached to the member 56 by the bolts 53 and extends into proximity of the sleeve 62. The space provided between the disk-shaped gear 35 and the ring 13a and the space provided between the cover plate 36 and the ring 13b communicate with the gap 14 and are sealed on the inside by sealing rings 37 and 38 and on the outside by sealing rings 68. The sealing ring 38 is mounted in a groove of cover plate 36 for axial displacement, such displacement being limited by adjustable stop screws 39. Springs 39' may be provided to urge the sealing ring 38 against the hub member 30b. Such springs 39', however, are less powerful than the springs 33 and 34 tending to urge the rings 13a and 13b apart.

The coil 11 may be energized through an electrical circuit including wires 42, slip rings 41 and suitable brushes which are diagrammatically indicated 40 and are suitably mounted on a common casing 69 which surrounds the primary clutch A and the secondary clutch B. The slip rings are carried by an annular disk 70 of insulating material. When the coil 11 is deenergized the rings 13a and 13b are urged apart by the springs 33 and 34 to a position determined by adjustment of the stop screws 39. These screws are so adjusted that the disk 16 may freely rotate between the rings 13a and 13b.

When the coil 11 is energized a flux indicated by the dotted line x is set up which extends through both the gap 14 and the gap accommodating disk 16. This flux is effective to cause mutual attraction of rings 13a and 13b and to magnetize and thus solidify the medium in gap 14, whereby a torque will be simultaneously transferred by both of the clutches A and B. The elements 55, 56, 13b, 16 and 13a conducting such flux and the gaps therebetween are so dimensioned and correlated that the couple transferred by the medium in gap 14 is incapable at any time during the initial phases of the energization of preventing clutch B from being fully engaged. As a result, first the clutch B will be engaged contrary to the tendency of springs 33 and 34. After such full engagement of clutch B the influence of the flux on the medium in gap 14 becomes so powerful as to gradually reduce the slippage between the driving primary clutch member 12 and the driven primary clutch members 13a and 13b to zero. In other words, upon engagement of clutch B the magnetic field set up by coil 11 is so increased as to increase the couple transferred in clutch A to the desired maximum value. In this manner, the gradual energization of coil 11 causes first the clutch B and subsequently the clutch A to be fully engaged.

The clutch disk 16 preferably consists of steel. It may be provided with a sintered friction lining having a high coefficient of friction.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Clutching mechanism for the transfer of the driving couple from the engine to a speed change transmission of a motor vehicle comprising a motor shaft, a primary clutch composed of a driving primary clutch member connected to said motor shaft and of a driven primary clutch member separated by a gap from said driving primary clutch member, a secondary clutch composed of a driving secondary clutch member rigid with said driven primary clutch member and of a driven secondary clutch member, and a transmission shaft connected with said driven secondary clutch member, said driven secondary clutch member being arranged radially inwardly of said primary clutch and having a smaller diameter and axial width and a smaller mass moment of inertia than has said driven primary clutch member, means for producing a magnetic flux in said primary clutch, said flux traversing said gap, contiguous paramagnetic particles located in said gap solidifiable by said magnetic flux for coupling said driving primary clutch member to said driven primary clutch member, said secondary clutch member comprising a friction coupling between its members responsive to said flux producing means, and each of said clutches being of a type permitting of engagement under load and of coincidental relative slippage of its members.

2. The clutching mechanism claimed in claim 1 combined with means for simultaneously actuating both the primary clutch and the secondary clutch in such a manner that the slippage occurring in said secondary clutch coincidentally to the actuation thereof is lower than the slippage occurring in said primary clutch coincidentally to the actuation thereof.

3. Clutching mechanism for the transfer of the driving couple from the engine to a speed change transmission of a motor vehicle comprising a motor shaft, a driving primary clutch member connected thereto, a driven primary clutch member separated from said primary clutch member by a gap, a clutching medium including magnetizable particles in said gap, means for producing a magnetic flux in said primary clutch extending through said gap and adapted to solidify said medium thereby causing engagement of the clutch formed by said clutch members under load and with relative slippage coincidental to such engagement, a driving secondary friction clutch member rigid with said driven primary clutch member, a driven secondary friction clutch member arranged in radially inwardly spaced relationship with said driving primary clutch member, means for engaging said secondary clutch members, and a transmission input shaft connected with said driven secondary clutch member.

4. Clutching mechanism for the transfer of the driving couple from the engine to a speed change transmission of a motor vehicle comprising a primary clutch and a secondary clutch both being electromagnetic clutches arranged in tandem relationship, the primary clutch being adapted to be connected to the engine and including a liquid suspension of magnetizable particles adapted to be solidified by the influence of magnetic flux, the secondary clutch being adapted to be connected to said transmission and being of an electromagnetic friction type, each of said clutches including a driving member and a driven member, the driven member of said secondary clutch being a disk having a considerably lower momentum of inertia than the driven member of said primary clutch.

5. Clutching mechanism as claimed in claim 4 including a winding common to both of said electromagnetic clutches, the driving members and the driven members of said clutches consisting of a magnetizable material and being so coordinated to said winding as to conduct a single flux induced by said winding for engagement of both of said clutches.

6. Clutching mechanism as claimed in claim 4 in which both of said clutches are arranged in coaxial nested relationship.

7. The combination claimed in claim 1 in which said driving secondary clutch member is integral with said driven primary clutch member.

8. Clutching mechanism for the transfer of the driving couple from the engine to a speed change transmission of a motor vehicle comprising an annular member of magnetizable material adapted to be connected to an engine to be rotated thereby about its axis and provided with an internal annular groove, an electric coil in said groove, a pair of rings of magnetizable material surrounded by said annular member and spaced therefrom by a gap, a liquid suspension of magnetizable particles in said gap, a driven shaft surrounded by said rings in coaxial relationship thereto, a friction disk fixed to said shaft and located between said rings, means for mounting said rings for relative axial displacement and mutual attraction under the influence of a flux set up by said coil for frictional engagement of said disk by said rings, and a spring coordinated to said rings and tending to urge the same apart to thereby resiliently disengage said rings from said disk.

9. The combination claimed in claim 4, wherein said primary clutch members and said secondary clutch members are arranged in tandem relationship, said driven secondary friction clutch member having a considerably smaller diameter and a considerably smaller axial width and a considerably smaller mass moment of inertia than has said driven primary clutch member, and said secondary clutch being also of a type which permits engagement under load and coincidental relative slippage of each of the respective members thereof.

10. Clutching mechanism for the transfer of the driving couple from the engine to a speed-change transmission of a motor vehicle comprising a primary clutch and a secondary clutch, both arranged in tandem relationship, the primary clutch being adapted to be connected to the engine and said secondary clutch being adapted to be connected to said transmission, said primary clutch including a driving member and said secondary clutch including a driven member, means interconnecting said clutches comprising a first part being driven by said primary clutch driving member and a second part rigidly connected with said first part for driving said secondary clutch driven member, chamber means including a gap between said primary driving member and said primary driven member, magnetic particles located in said chamber means, and means for producing a magnetic flux in said primary clutch capable of solidifying said magnetic particles and to thereby couple said driving member to said first part, said secondary clutch comprising a friction coupling between said second part and said driven member, said driven member of the secondary clutch having a considerably smaller diameter and axial width and a considerably smaller mass moment of inertia than has the first part of said interconnecting means, each of said clutches being of the type permitting engagement and coincidental relative slippage of its driving and driven parts under load.

11. Clutching mechanism according to claim 10, wherein at least one of the clutches is electromagnetically operated.

12. Clutching mechanism for the transfer of the driving couple from the engine to a speed-change transmission of a motor vehicle comprising a motor shaft, a driving primary clutch member connected thereto, a driven primary clutch member separated from said primary clutch member by a gap, a clutching medium including magnetizable particles in said gap, means for producing a flux extending through said gap and adapted to solidify said medium thereby causing engagement of the clutch formed by said clutch members under load and with relative slippage coincidental to such engagement, a driving secondary friction clutch member rigid with said driven primary clutch member, a driven secondary friction clutch member, means for engaging said secondary clutch members, and a transmission input shaft connected with said driven secondary clutch member, said driven secondary clutch member being a friction disk.

13. Clutching mechanism for the transfer of the driving couple from the engine to a speed-change transmission of a motor vehicle comprising a motor shaft, a driving primary clutch member connected thereto, a driven primary clutch member separated from said primary clutch member by a gap, a clutching medium including magnetizable particles in said gap, means for producing a flux extending through said gap and adapted to solidify said medium thereby causing engagement of the clutch formed by said clutch members under load and with relative slippage coincidental to such engagement, a driving secondary friction clutch member rigid with said driven primary clutch member, a driven secondary friction clutch member, means for engaging said secondary clutch members, and a transmission input shaft connected with said driven secondary clutch member, said driven secondary clutch member being a friction disk provided with a sintered friction lining having a high coefficient of friction.

References Cited in the file of this patent

UNITED STATES PATENTS

| 1,744,637 | Jacobs et al. | Jan. 21, 1930 |
| 2,664,981 | D'Ozouville | Jan. 5, 1954 |

FOREIGN PATENTS

| 916,919 | Germany | Aug. 19, 1954 |
| 1,104,957 | France | June 22, 1955 |